United States Patent [19]

Silverstein et al.

[11] Patent Number: 5,262,785
[45] Date of Patent: Nov. 16, 1993

[54] SMALL TARGET DOPPLER DETECTION SYSTEM

[75] Inventors: Seth D. Silverstein; Robert L. Nevin, both of Schenectady, N.Y.

[73] Assignee: General Electric Co., Moorestown, N.J.

[21] Appl. No.: 876,958

[22] Filed: Apr. 30, 1992

[51] Int. Cl.$^5$ .............................................. G01S 13/52
[52] U.S. Cl. ...................................... 342/162; 342/90; 342/192
[58] Field of Search ................ 342/90, 115, 160, 162, 342/192

[56] References Cited

U.S. PATENT DOCUMENTS

| | | | |
|---|---|---|---|
| 4,630,051 | 12/1986 | Adams et al. | 342/192 X |
| 5,068,597 | 11/1991 | Silverstein et al. | 342/192 X |
| 5,121,125 | 6/1992 | Guerci et al. | 342/192 X |
| 5,202,691 | 4/1993 | Hicks | 342/90 |

OTHER PUBLICATIONS

U.S. Patent Application, "Source Identification System for Closely Separated Spatial Sources", Seth David Silverstein, Ser. No. 07/876,957 filed Apr. 30, 1992.

"MTI and Pulse Doppler Radar", Introduction to Radar Systems, 2nd Edition, by M. I. Skolnik, pp. 101–106 (1980).

Primary Examiner—T. H. Tubbesing
Attorney, Agent, or Firm—W. H. Meise; C. A. Nieves; S. A. Young

[57] ABSTRACT

A small target phased array Doppler detection system receives signals from remote moving targets and determines Doppler frequency shift and the respective powers of coherent electromagnetic signals for the purpose of detection and identification of relatively small, slow moving targets in the presence of scattering echoes due to clutter. The system employs covariance analysis of the received signals followed by eigenanalysis to produce eigenvectors and eigenvalues. A superresolution algorithm creates dwell manifold vectors which indicate velocities of targets from the eigenvectors. The relative power of radar echoes contribute information relevant to the identification of real moving targets as opposed to false alarms.

8 Claims, 5 Drawing Sheets

SMALL TARGET DOPPLER DETECTION SYSTEM

CROSS REFERENCES TO RELATED APPLICATIONS

Reference is made to related application Ser. No. 07/876,957 "SOURCE IDENTIFICATION SYSTEM FOR CLOSELY SEPARATED SPATIAL SOURCES" by Seth David Silverstein, filed simultaneously with this application and assigned to the present assignee.

BACKGROUND OF THE INVENTION

1. Field of the Invention

The invention relates to radar detection of moving targets and more specifically to Doppler radar detection of moving targets in the presence of strong scattering echoes.

2. Description of Related Art

Radar systems transmit radiation toward moving targets and receive the reflected signals from the targets. A phased array having a plurality of sensors distributed over a surface detects the reflected signals from the moving targets. Phased array geometries can be either one or two dimensional. Spatial selection is obtained by concentrating the transmitted and/or received energy to a specific solid angle with reference to the phased array. Focusing is accomplished by adjusting the complex weightings of the signals received at the different receiving elements of the phased array. For a pulsed system, echoes from objects within a range interval also within the focused solid angle, known as a range cell, may be selected by sampling the focused signal at delay times commensurate with the round trip travel time of the pulse to the specific range of interest.

In most state of the art operational radars, moving targets are detected using the Doppler frequency shifts of the radar echoes from the moving targets. The Doppler frequency shifts are proportional to a component of the target's velocity in the direction of an axis from the phased array to the target.

The detection of echoes with small Doppler shifts is limited by two effects: the Rayleigh resolution of the linear spectral analysis, and the spectral spreading due to decorrelation of clutter echoes. The Rayleigh resolution is inversely proportional to the coherent dwell time, that is the time duration of the coherent radar data collection. The spectral spreading of the clutter is driven in part by random scattering of radar echoes off of ocean waves known as "clutter", whose velocity may vary slightly over the many waves within a range cell. For sea clutter under some conditions the spectral spread may be much smaller for a very short coherent dwell than for a longer dwell.

Moving target detection has been accomplished by linear spectral analysis processing methods. Most common among these is the "Moving Target Indicator" (MTI) as described in Introduction to Radar Systems, 2nd Edition, by M. I. Skolnik, pp. 101-106, McGraw-Hill Pub. Co., New York, N.Y. (1980). This method subtracts corresponding echoes measured at consecutive pulse times, thus canceling those echoes whose phase and amplitude do not change from one pulse time to the next. The MTI method is often supplemented by Fast Fourier Transform (FFT) processing, acting on corresponding echoes from several identical, equally-spaced pulses. The FFT processing sorts the echoes into several Doppler frequency ranges known as "Doppler bins", and provides signal to noise enhancement through coherent integration. FFT processing is sometimes used without MTI, but has the disadvantage that large amounts of clutter may appear in the target-associated Doppler bins through a phenomenon known as spectral leakage.

Problems relating to temporal frequency estimation of signals using a sampled time series when temporal coherence is maintained over a time period are conceptually similar to problems of spatial frequency estimation for distant spatially separated sources. Significant advances in spatial frequency estimation have been made in recent years in the development of analyzers employing phased arrays which can accurately estimate the direction of arrival (DOA) of targets.

Electromagnetic or acoustic waves arising from distant targets behave as plane waves incident upon the array. Near optimal performance results for the DOA estimates are exhibited by the subspace array processing algorithms such as, for example, the MUSIC algorithm (See "Multiple Emitter Location and Signal Parameter Estimation", R. O. Schmidt, IEEE Trans Antennas and Propagation, Vol. AP-34, pp. 276-280, March 1986), the Root-MUSIC algorithm, (See "The Mathematical Basis for Element and Fourier Beam Space MUSIC and Root-MUSIC Algorithms", S. D. Silverstein and M. D. Zoltowski, Digital Signal Processing, Vol. 1 pp. 161-175, July 1991), and the ESPRIT algorithm (See "ESPRIT—A Subspace Rotational Approach to Signal Parameter Estimation", R. Roy, A. Paulraj, and T. Kailath, IEEE Trans, Acoust. Speech Signal Process vol. ASSP-34, pp. 1340-1342, October 1986).

Conventional radar Doppler systems compute the Doppler shifts of moving targets but there are problems estimating Doppler shifts for: targets with small radar cross sections; slowly moving targets such as small boats; and slowly moving aircraft in the presence of clutter due to ocean waves.

Currently, there is a need for a moving target detection system that can detect and track moving targets represented by small radar echoes whose Doppler shifts are close to zero, in the presence of much more powerful clutter echoes whose Doppler shifts are also very close to zero.

SUMMARY OF THE INVENTION

A land-based or shipboard small target Doppler detection system transmits coherent radiation pulses in a desired angular sector which are reflected off of moving targets and subsequently receives echoes at a predetermined delay interval. The delay interval prescribes a range cell being a spatial sector between a range interval, that is currently being monitored by the detection system. Several successive pulses transmitted and received after the delay interval in the same sector are known as a coherent dwell. During each coherent dwell, a phased array receives echoes that are demodulated, converted to a digital value and stored. This process is repeated for a number of dwells at intervals somewhat longer than the coherent dwell time, for the same sector. Each uncorrelated set of samples of the coherent dwell is known as a "realization" of the dwell.

In gathering data for this method of moving target detection, it is important that both clutter due to random scattering echoes from ocean waves for a sea-based system and the moving target maintain temporal coherence during each coherent dwell. It is equally important that either the moving target or the clutter lose coherence from dwell to dwell. The short coherence times for radar sea clutter scattering should provide this necessary decorrelation. This is the reasoning behind the time interval between dwells on the same field of view. The requirement for coherence of clutter within the coherent dwell would not generally be satisfied for a radar operating from a platform moving at high speed (e.g. airborne or spaceborne), thus this invention is primarily useful for ground-based and shipboard radar.

In conventional land radar systems using a stationary platform, sources of clutter are relatively stationary, causing correlation between sets of data acquired at different time intervals. Therefore, multiple uncorrelated realizations required for the Doppler processing may be difficult to obtain. Alternatively, in an ocean scenario, the dephasing effects of the scattering from the ocean waves reduce the coherence times of the echo signals to the extent that multiple realizations of the coherent time series can be obtained.

A covariance generation unit constructs a sample covariance matrix from a number of uncorrelated realizations. For a coherent dwell with M received echoes, the sample covariance matrix will be an $M \times M$ matrix. An eigenanalysis processor generates a set of eigenvectors and eigenvalues from the sample covariance matrix. This results in two orthogonal subspaces referred to as a signal subspace and a noise subspace. The moving targets can be represented as vectors. These moving target vectors are primarily contained within the signal subspace, hence they are approximately orthogonal to the noise subspace and may be separated. Once they are separated, the relative powers of the moving targets may be determined. A source number estimator determines the number of moving targets from the eigenvectors. A Doppler processor estimates the Doppler frequency shifts of the number of moving targets by employing a temporal frequency version of the superresolution spatial frequency estimation algorithms such as MUSIC, Root-MUSIC, or ESPRIT. A power estimation processor performs analysis based upon the effects of fluctuations due to finite data sampling on a sample covariance matrix. A target detection logic unit identifies moving targets to be tracked based upon the field-of-view and signal to noise ratio of the source. A signal synthesis and decoding unit processes the identified signals and suppresses undesired moving targets for presentation on an output device.

The present invention provides a power estimation of the radar signals to ascertain whether a real moving target is present in a field of view; the target velocity from the magnitude of the Doppler shift; and the radar cross section from the estimate of the SNRs of the radar echoes.

OBJECTS OF THE INVENTION

It is an object of the present invention to provide a system which distinguishes moving targets from reflected clutter echoes.

It is another object of the present invention to provide a system which estimates a signal to noise ratio (SNR) of a Doppler frequency shifted signal that originates from a low-radar-cross-section slowly moving target.

It is another object of the present invention to provide a system which estimates a signal to noise ratio (SNR) of a Doppler frequency shifted signal to determine the presence or absence of a moving target.

It is another object of the present invention to provide a system which distinguishes moving targets of particular interest from moving targets of little interest such as birds.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF THE PREFERRED EMBODIMENT

Figure 1:
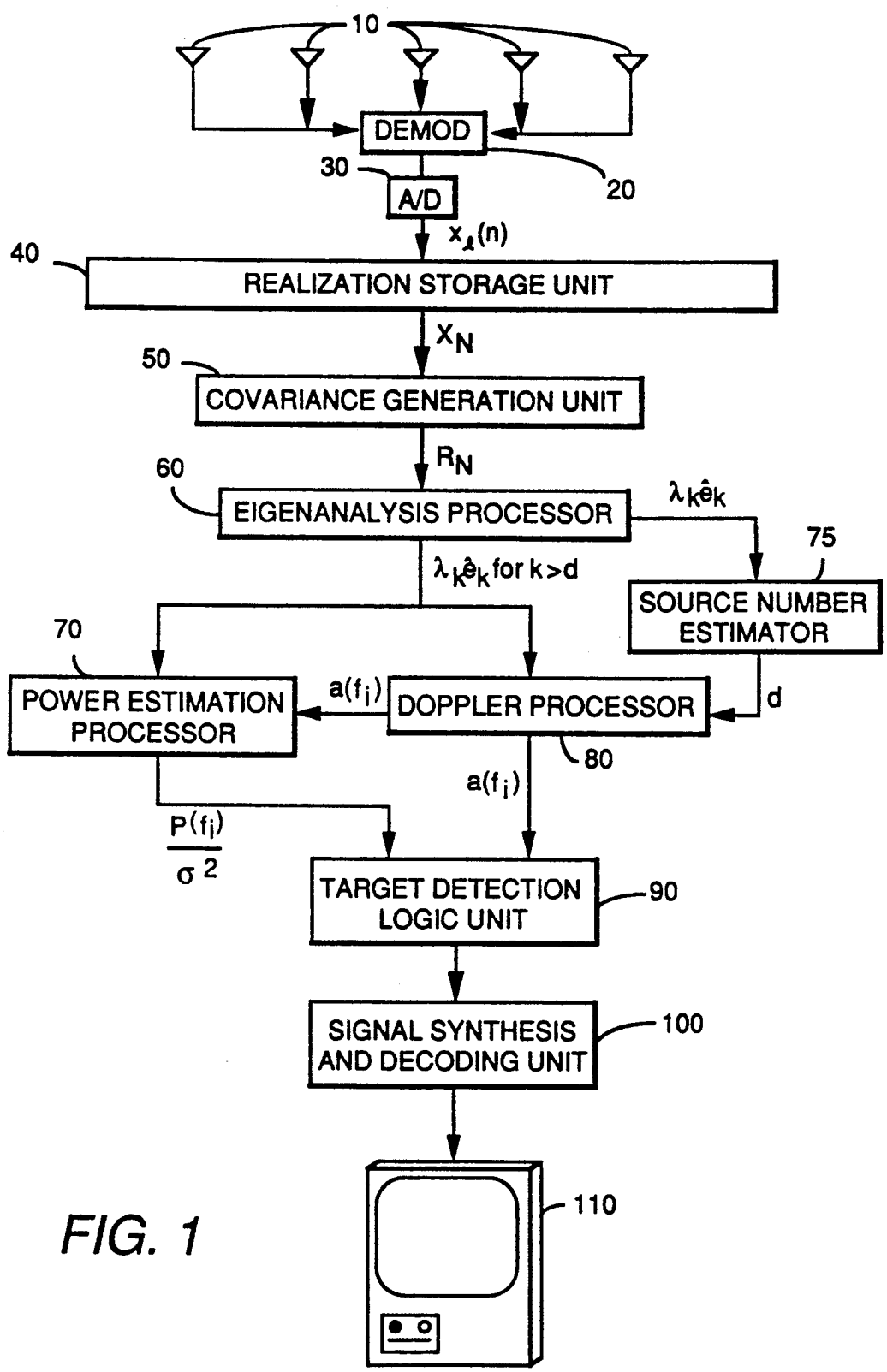
FIG. 1 is a block diagram of a small target Doppler detection system of the present invention.

A small target Doppler detection system shown in FIG. 1 employs Doppler radar detection for identification of relatively weak scattering or slowly moving targets in the presence of random radar scattering known as "clutter". The system estimates the signal to noise ratio (SNR) of transmitted or reflected signals from a number of remote moving targets incident upon a phased array 10. In the preferred embodiment, the system employs a pulsed radar system where radiation is transmitted as narrow band signals having modulation bandwidths $\Delta\omega$ that are small compared to the carrier frequencies, $\omega_c$, i.e., $\Delta\omega/\omega_c << 1$.

Figure 2:
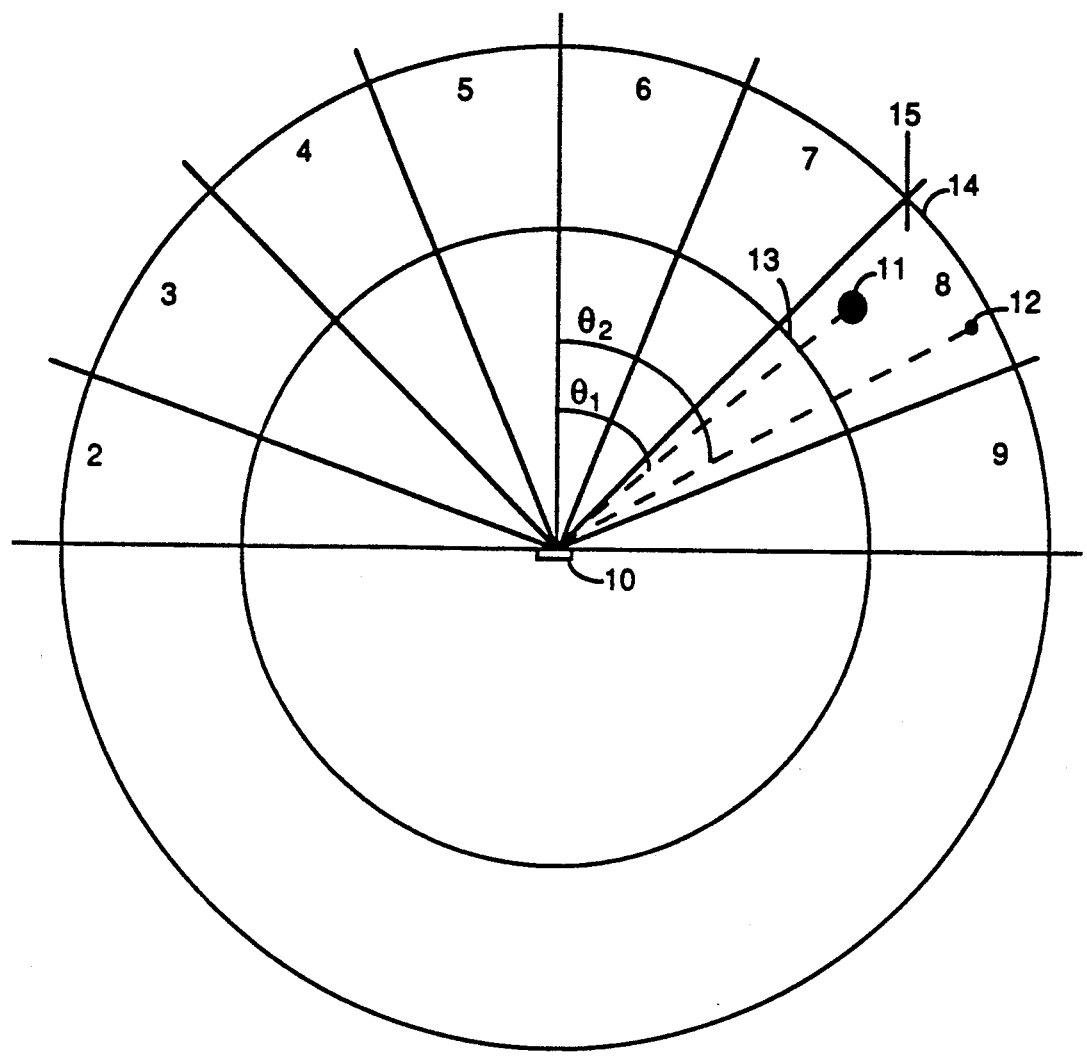
FIG. 2 illustrates the geometry by which the present invention is capable of sensing targets.

In FIG. 2, phased array elements 10 are shown in relation to spatial sectors numbered 2-9. A series of radiation pulses are transmitted toward a number of moving targets 11, 12 at bearing angles $\theta_1$, $\theta_2$ respectively, allowing enough time for the transmitted radiation to reach the targets, and be reflected back to array 10 before transmitting a subsequent radiation pulse. The transmitted pulses and received echoes are timed such that targets within a desired range interval may be sensed. Since radiation propagates at a specific velocity through a given medium, the timing between transmitting a pulse and receiving its echo may be adjusted to define a range cell 15, being spatial sector 8 between ranges 13 and 14. A number of pulses are sequentially transmitted and received in a short time period. The set of pulses is known as a "coherent dwell". The angular direction (steering) is chosen by adjusting the phase of the signals at each phased array element. This steering process applies equally to both transmission and reception. In the interval between successive coherent dwells, the radar beam may be directed to other sectors 2-7, or 9 for similar sensing, and thus coverage of several fields of view may be interleaved to efficiently use the radar resources. Altering the field of view by electronic beam direction is essentially instantaneous.

Phased array sensors 10 create coherent signals upon receiving the echo from the moving target 11, 12. In FIG. 1, each sample from phased array 10 is individually modulated down to baseband by a demodulator 20 and digitized by an analog-to-digital (A/D) converter 30 to a value $x_l(n)$ where n is an index represents the nth received echo, and l is an index representing the lth coherent dwell. A set of M digitized samples for all echoes of the transmitted pulses in a coherent dwell is known as a "realization" of a coherent dwell.

The digitized values lth realization can be conveniently stored in a vector format as:

$$x_l = [x_l(0), x_l(1) \ldots x_l(M-1)] \qquad (1)$$

The M components of $x_l$ correspond to the complex representation of the signal received at the lth realization. Values from multiple realizations are accumulated by a realization storage unit 40 and each digitized value separately stored in a data matrix $X_N$ within realization storage unit 40, where the columns of the data matrix correspond to the individual realization vectors $x_l$.

Each of the signals received by the phased array conveys information about the physical parameters of the target. The physical parameters of interest of the targets are the target velocities, DOA angles, the Doppler frequency shifts of the signals, and the mean spatial signal powers from the moving sources at the array. These physical parameters are statistical quantities that must be determined by statistical estimation. In statistical analyses, the data corresponding to random processes is accumulated in a digital format and cross correlated to extract the desired statistical information. The cross correlation of the data is usually organized in matrix format known as a sample covariance matrix $R_N$.

Covariance generation unit 50 manipulates digitized values $X_N$ to produce products referred to in the art as the matrix outer product which form the sample covariance matrix $R_N$. For N realizations, the sample covariance matrix $R_N$ is a Hermitian matrix having $M \times M$ individual matrix elements where M is the number of transmitted pulses in a coherent dwell, and $R_N(m, n)$ corresponds to the mth row and nth column given by:

$$R_N(m,n) = \frac{1}{N} \sum_{l=1}^{N} x_l(m) x_l^*(n) \qquad (2)$$

where $x_l^*(n)$ represents the complex conjugate of the digitized values $x_l(n)$.

The information necessary to obtain the most probable value of the physical parameters is contained in the structure of the sample covariance. This information can be extracted by utilizing mathematical eigenstructure of the sample covariance matrix. An Mth order covariance matrix will possess M eigenvectors such that the product of the matrix with one of its eigenvectors produces a constant times the eigenvector. The constant is known as an eigenvalue of the matrix corresponding to the specific eigenvector.

Eigenanalysis processor 60 then performs eigenanalysis on the sample covariance matrix. For an Mth order array, the $M \times M$ sample covariance matrix will have M eigenvectors that satisfy the matrix equation, $$R_N \hat{e}_k = \lambda_k \hat{e}_k \qquad (3)$$

Here $\lambda_1 \geq \ldots \lambda_M$ are eigenvalues and $\hat{e}_1, \ldots, \hat{e}_M$ are the corresponding eigenvectors of $R_N$. The eigenvectors of $R_N$ are an orthonormal set of basis vectors, $\hat{e}_m^H \hat{e}_n = \delta_{mn}$.

A source number estimator 75 receives the eigenvectors and eigenvalues from eigenanalysis processor 60 and determines the number of sources d. Source number estimator 75 may determine the number of sources according to a source order estimation algorithm well known in the art such as described in "Detection of Signals by Information Theoretic Criteria", M. Wax and T. Kailath, IEEE Trans ASSP, Vol. 33, pp. 387-392, April 1985.

For an infinite number of decorrelated realizations, eigenvectors $\hat{e}_1, \ldots, \hat{e}_M$ of the asymptotic form of sample covariance matrix $R_N$ can be divided into two orthogonal subspaces referred to as the signal and noise subspaces. The signal subspace has dimension d corresponding to the d moving targets, while the orthogonal noise subspace will have dimension M−d. The clutter is counted as a moving target. For an infinite number of realizations, the noise subspace eigenvalues will all be equal to $\sigma^2$, the average noise power per echo.

A Doppler processor 80 responsive to eigenanalysis processor 60 and source number estimator 75 employs a superresolution frequency estimation technique similar to conventional algorithms such as, for example MUSIC, Root MUSIC, or ESPRIT to determine Doppler shifts of the moving targets from the number of sources d and the eigenvectors and eigenvalues. Once the Doppler shifts are accurately estimated, a set of dwell manifold vectors each corresponding to a moving target are created by Doppler processor 80. For d moving targets with Doppler shifts, $f_1, f_2, \ldots, f_d$, the d source dwell manifold vectors contained within the total dwell manifold have the functional form, $$a(f_i) = \frac{1}{\sqrt{M}} [z_i^0, z_i^1, \ldots z_i^{M-1}]^T, \qquad (4)$$

with $z_i^q = e^{j2\pi f_i}$ where $q = 0, 1, \ldots, M-1$.

In an infinite number of realizations, source dwell manifold vectors $a(f_i)$ are contained entirely within the signal subspace, hence they are orthogonal to the noise subspace. For finite numbers of dwell realization, the source dwell manifold vectors are only approximately orthogonal to the noise subspace eigenvectors. The explicit functional dependence on the system parameters of the finite projections of the source dwell manifold vectors $a(f_i)$ onto the noise subspace eigenvectors provide the necessary information to determine the relative source powers. A power estimation processor 70 performs computational analysis based upon fundamental considerations of the effects of fluctuations due to finite data samples on the mathematical structure of sample covariance matrix $R_N$.

Doppler processor 80 creates a frequency spectrum $S(f_i)$ that is equal to the reciprocal of the square of the value of the projection of the source dwell manifold vectors $a(f_i)$ onto the noise subspace eigenvectors $\hat{e}_k$. The non-orthogonality of the dwell manifold vectors $a(f_i)$ with the noise subspace eigenvectors for finite number of dwell realizations implies that the values of the frequency spectrum $S(f_i)$ will be finite.

For signals from d moving targets received by M pulses per coherent dwell, the frequency spectrum $S(f_i)$ evaluated at accurate Doppler frequency estimates {$f_i$}, approximately satisfies the equation:

$$S(f_i) \approx \frac{P_i MN}{\sigma^2(M - d)} . \quad (5)$$

Here N is the number of uncorrelated dwell realizations;

$$\frac{P(f_i)}{\sigma^2}$$

are the mean values of the source powers represented by their signal to noise ratios; and $\sigma^2$ is the noise power per received pulse. Power estimation processor 70 estimates the power directly by fitting the value of the frequency spectrum calculated from the data to the functional relation given by Eq. 5.

$D(f_i)$ is defined as the reciprocal of $S(f_i)$.

$$D(f_i) = \frac{1}{S(f_i)} = \sum_{k=M-d+1}^{M} |a^H(f_i)\hat{e}_k|^2 \quad (6)$$

Power estimation processor 70 calculates the projection of the estimated source dwell manifold vectors $a(f_i)$ onto the approximate noise subspace eigenvectors $\hat{e}_k$ of the sample covariance matrix $R_N$. Since $$D(f_i) \approx \frac{\sigma^2(M - d)}{P_i MN}$$

from Eq. 6, the estimated signal to noise ratios $$\left(\frac{P(f_i)}{\sigma^2}\right)_{est}$$

of the moving targets follow directly from Eq. 6, using the stored calculated values of the source dwell manifold vectors and the approximate noise eigenvectors $\hat{e}_k$. Here, $$\left(\frac{P(f_i)}{\sigma^2}\right)_{est} = \frac{(M - d)}{MN} \frac{1}{D(f_i)} \quad (7)$$

In an alternative embodiment, power estimation processor 70 can estimate the signal powers using a subset of the noise subspace. For example, for any single noise eigenvector one can use the approximate relation:

$$\left(\frac{P(f_i)}{\sigma^2}\right)_{est} \approx \frac{1}{MN} \frac{1}{|a^H(f_i)\hat{e}_k|^2}, \text{ for } k > d \quad (8)$$

A target detection unit 90 receives the source dwell manifold vectors $a(f_i)$ indicating the Doppler shifts of the moving targets, and the SNR of each target from Doppler processor 80 and power estimation processor 70, respectively. Target detection unit 90 determines which moving targets to track, and which moving targets to ignore based upon its input. For example, the SNR of a reflected radar signal from a bird will usually be considerably lower than the echo from an aircraft at a comparable range. Target detection unit 90 separates the signals which are to be tracked from those that are to be ignored, and passes the tracked signals onto a signal synthesis and decoding unit 100 which decodes the tracked signal and creates a display signal. An output device 110 may be a radar monitor which displays an image of the tracked moving targets for a user to view and analyze.

Output device 110 may alternatively be a digital computer that further processes the received signal, or a control device to actuate mechanisms such as navigational equipment in a ship to move the ship relative to the sensed moving targets.

In alternative embodiments signal synthesis and decoding unit 100 and output devices 110 will vary according to the intended use.

A simulation was conducted using the present invention as it would be employed in a radar system. The simulations feature coherent dwells composed of 8 pulses that are uniformly spaced in time at a pulse repetition frequency of 5 KHz. The overall dwell has a coherent time of 1.6 msec, corresponding to a Rayleigh resolution of 625 Hz. In the simulations, source Doppler frequency estimates are made using the Root-MUSIC algorithm which is capable of detecting sub-Rayleigh Doppler shifts for weak moving targets in the presence of the large power clutter DC signal. The power estimates in these simulations are made using the approximate relation described by Eq. 7 above.

Figure 3:
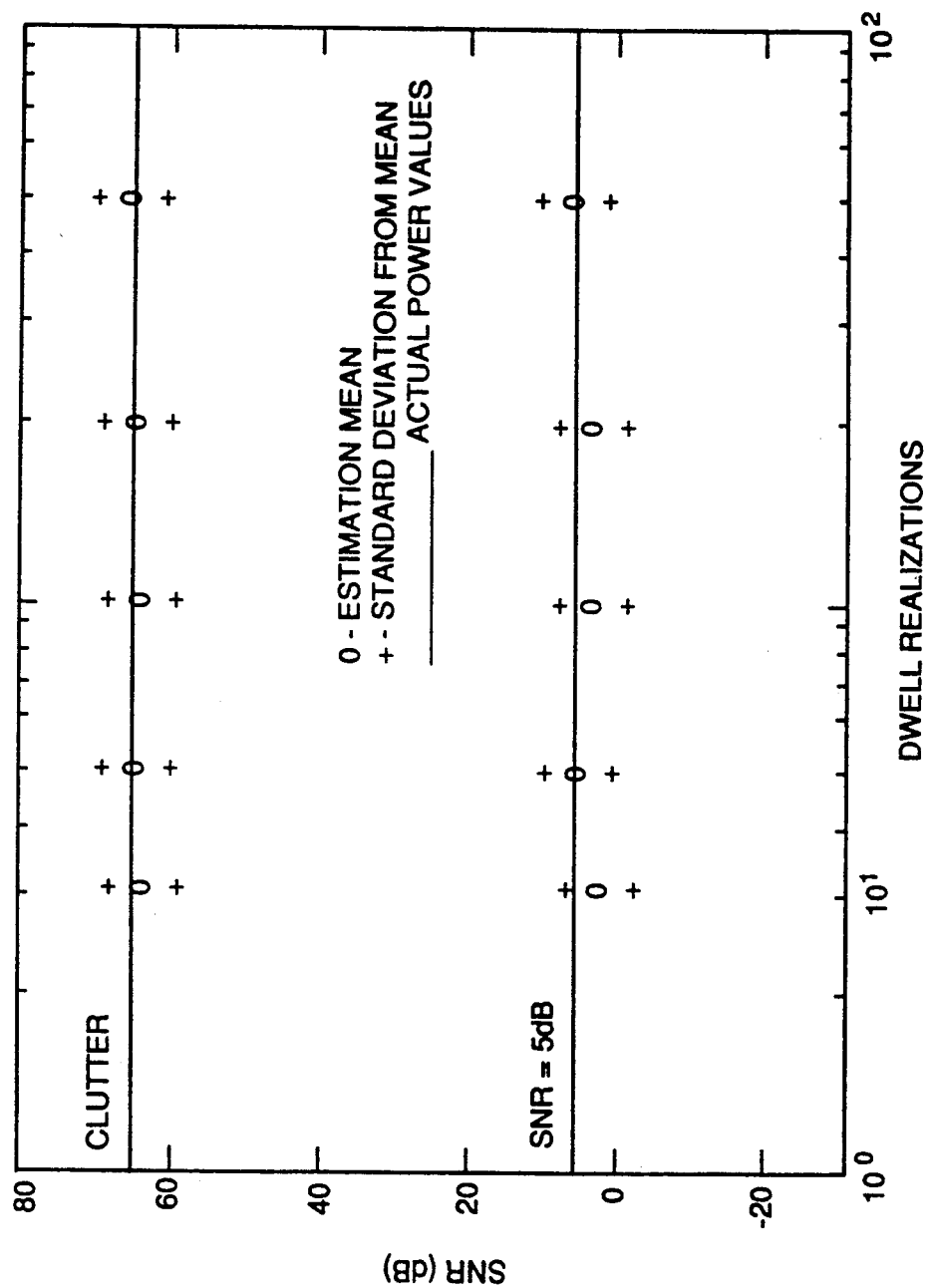
FIG. 3 is a logarithmic graph of statistical simulation results for power estimates as a function of the number of uncorrelated realization for a target velocity of approximately 15 knots.

FIG. 3 illustrates statistical results for the power estimates as a function of the number of dwell realizations for the specific case of a single moving source in the presence of a DC clutter peak. The parameters for this simulation are: a clutter peak at 65 dB and a moving target source at 5 dB SNR. The Doppler shift of the moving source is taken to be ½ the Rayleigh resolution. Both mean and standard deviations of the power estimates are given. As the estimates for each set of N realizations are made from the logarithm of the Doppler shift spectrum, the mean and standard deviations plotted in the figure correspond respectively to the mean and standard deviations of the logarithmic quantities. Statistics were accumulated using 100 independent runs for each of the realization orders indicated by the data points in the figure. An important aspect of the present invention is the fact that the power estimates are accurate for a relatively small number of realizations, down to five realizations.

Figure 4:
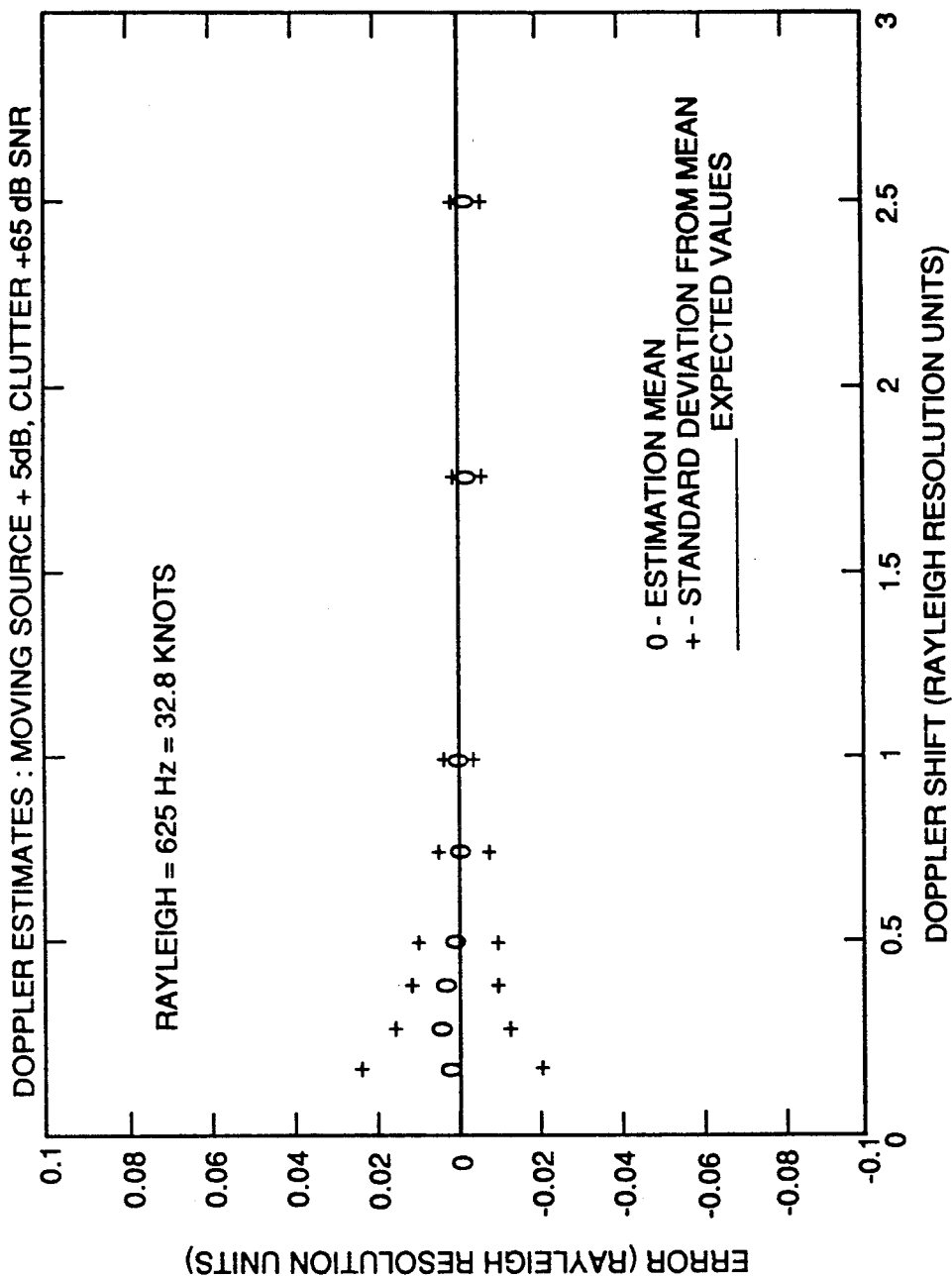
FIG. 4 illustrates simulation results for errors in the Doppler frequency estimates as a function of the Doppler shift relative to the Rayleigh temporal frequency resolution of the coherent dwell.

FIG. 4 illustrates simulation results for errors in the Doppler frequency estimates as a function of the Doppler shift relative to the Rayleigh temporal frequency resolution of the coherent dwell. The coherent time aperture is composed of 8 separate pulses with a uniform pulse separation time of 0.2 msec. These estimates are made using 20 uncorrelated realizations of the time series. The power difference of the clutter and target echoes are 60 dB.

Figure 5:
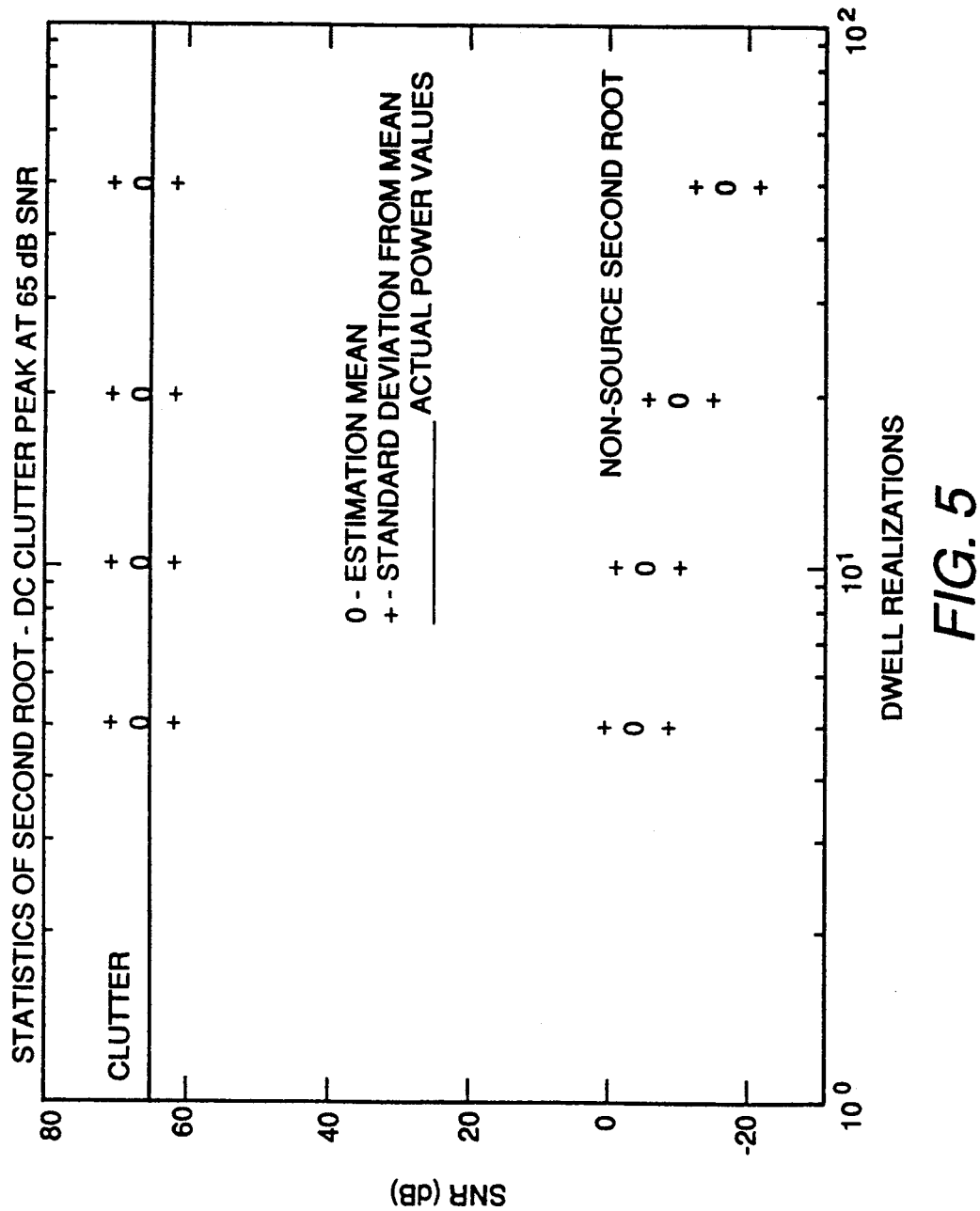
FIG. 5 illustrates simulation results for the power estimates when a single moving source is assumed in addition to clutter but no moving targets actually exist in the field of view.

FIG. 5 illustrates the statistical behavior of the power estimate when a single moving source in addition to the clutter is assumed, but no moving targets actually exists in the field of view. The mean value of the power estimates on a dB scale falls off linearly with the logarithm of the realization number. This statistical information is used to identify the presence of a real moving target in the field of view.

While several presently preferred embodiments of the invention have been described in detail herein, many modifications and variations will now become apparent to those skilled in the art. It is, therefore, to be understood that the appended claims are intended to cover all such modifications and variations as fall within the true spirit of the invention.

What we claim is:

1. A small target Doppler detection system which identifies and displays remote moving targets comprising:

a) at least one phased array sensor for transmitting a plurality of coherent dwells, each coherent dwell comprising a plurality of M radiation pulses sequentially transmitted at a predetermined time index to a desired spatial angular sector toward said moving targets and for receiving a reflected Doppler frequency shifted echo from said moving targets;

b) a demodulator responsive to the phased array for demodulating the received echoes from the array, c) an analog-to-digital (A/D) converter responsive to the demodulator for converting the demodulated echoes to a digital value $x_l(n)$ where l is the index representing the coherent dwell from which the value was obtained and n is an index representing the pulse within the lth coherent dwell;

d) a realization storage unit responsive to the A/D converter for collecting a plurality of realizations $X_N$, each realization being all the digital values $x_l(n)$ for a predetermined number N of coherent dwells;

e) a covariance generation unit responsive to the realization storage unit for calculating a set of covariance values $R_N$ from digital values $x_l(n)$ for the plurality of realizations $X_N$;

f) an eigenanalysis processor responsive to the covariance generation unit for creating set of noise and source eigenvalues and eigenvectors $\lambda_k \hat{e}_k$ from the covariance values $R_N$;

g) a source number estimator responsive to the eigenanalysis processor for determining a number of sources d from the set of eigenvalues and eigenvectors $\lambda_k \hat{e}_k$;

h) a Doppler processor responsive to the eigenanalysis processor and the source number estimator for determining a set of dwell manifold vectors $a(f_i)$ indicating the Doppler shifted frequency echo of said remote moving targets from the number of sources d and the set of eigenvalues and eigenvectors $\lambda_k \hat{e}_k$;

i) a power estimation processor responsive to the eigenanalysis processor and the Doppler processor for creating a set of signal to noise estimates $$\left( \frac{P(f_i)}{\sigma^2} \right)_{est}$$

for each of said remote moving targets;

j) a target detection logic unit responsive to the power estimation processor and the Doppler processor for selecting which moving targets to monitor and which to suppress, by analyzing the dwell manifold vectors $a(f_i)$ and signal to noise estimates $$\left( \frac{P(f_i)}{\sigma^2} \right)_{est}$$

for each source;

k) a signal synthesis and decoding unit for decoding the identified signals and synthesizing a display signal; and l) an output device for creating an image representing the identified moving targets from the synthesized display signal.

2. The small target Doppler detection system of claim 1 wherein the covariance generation unit comprises means for calculating a set of covariance values $R_N$ from digital values $x_l(n)$ by performing the steps of calculating a matrix outer product according to the equation:

$$R_N(m,n) = \frac{1}{N} \sum_{l=1}^{N} x_l(m) x_l^*(n)$$

where $x_l^*(n)$ represents the complex conjugate of the digitized values $x_l(n)$, m is the mth row and n is the nth column of a matrix of covariance values $R_N$.

3. The small target Doppler detection system of claim 1 wherein the eigenanalysis processor comprises means for creating noise and source eigenvalues and eigenvectors from the covariance values $R_N$ according to the equation:

$$R_N \hat{e}_k = \hat{\lambda}_k \hat{e}_k$$

where $\hat{\lambda}_1 \geq \ldots \hat{\lambda}_M$ are eigenvalues and $\hat{e}_1, \ldots, \hat{e}_M$ are the corresponding eigenvectors of $R_N$ and are an orthonormal set of basis vectors.

4. The small target Doppler detection system of claim 1 wherein the Doppler processor comprises means for determining a set of dwell manifold vectors $a(f_i)$ from the noise and source eigenvalues by executing the steps of searching all possible dwell manifold vectors for those which are substantially orthogonal to the noise eigenvectors.

5. The small target Doppler detection system of claim 1 wherein the Doppler processor comprises means for determining a set of dwell manifold vectors $a(f_i)$ from the noise and source eigenvalues by executing the steps of a conventional superresolution algorithm.

6. The small target Doppler detection system of claim 1 wherein the power estimation processor comprises means for creating a set of signal to noise estimates $$\left( \frac{P(f_i)}{\sigma^2} \right)$$

for each of said remote moving targets by executing the steps of projecting each of said source dwell manifold vectors $a(f_i)$ onto a respective one of a noise eigenvectors $\hat{e}_k$ for $k = M-d+1$, M, summing the projected vectors and determining an approximate signal to noise estimate according to the equation:

$$\left( \frac{P(f_i)}{\sigma^2} \right)_{est} = \frac{(M-d)}{MN} \frac{1}{D(f_i)}$$

where $$D(f_i) = \sum_{k=M-d+1}^{M} |a^H(f_i) \hat{e}_k|^2,$$

d is the number of moving targets calculated from the source number estimator, $a^H(f_i)$ is the Hermitian of the source dwell manifold vectors $a(f_i)$, N is the number of uncorrelated realizations, and $\sigma^2$ is the mean noise power per radiation pulse.

7. The small target Doppler detection system of claim 1 wherein the signal synthesis and decoding unit comprises a means for creating a video signal from the identified signals, and the output device is a monitor which displays the video signal.

8. The small target Doppler detection system of claim 1 wherein the signal synthesis and decoding unit comprising a means for decoding a digital signal from the identified signals, and the output device comprises a digital processor and storage unit for data collection and processing.

* * * * *